W. BOYD 3,062,238

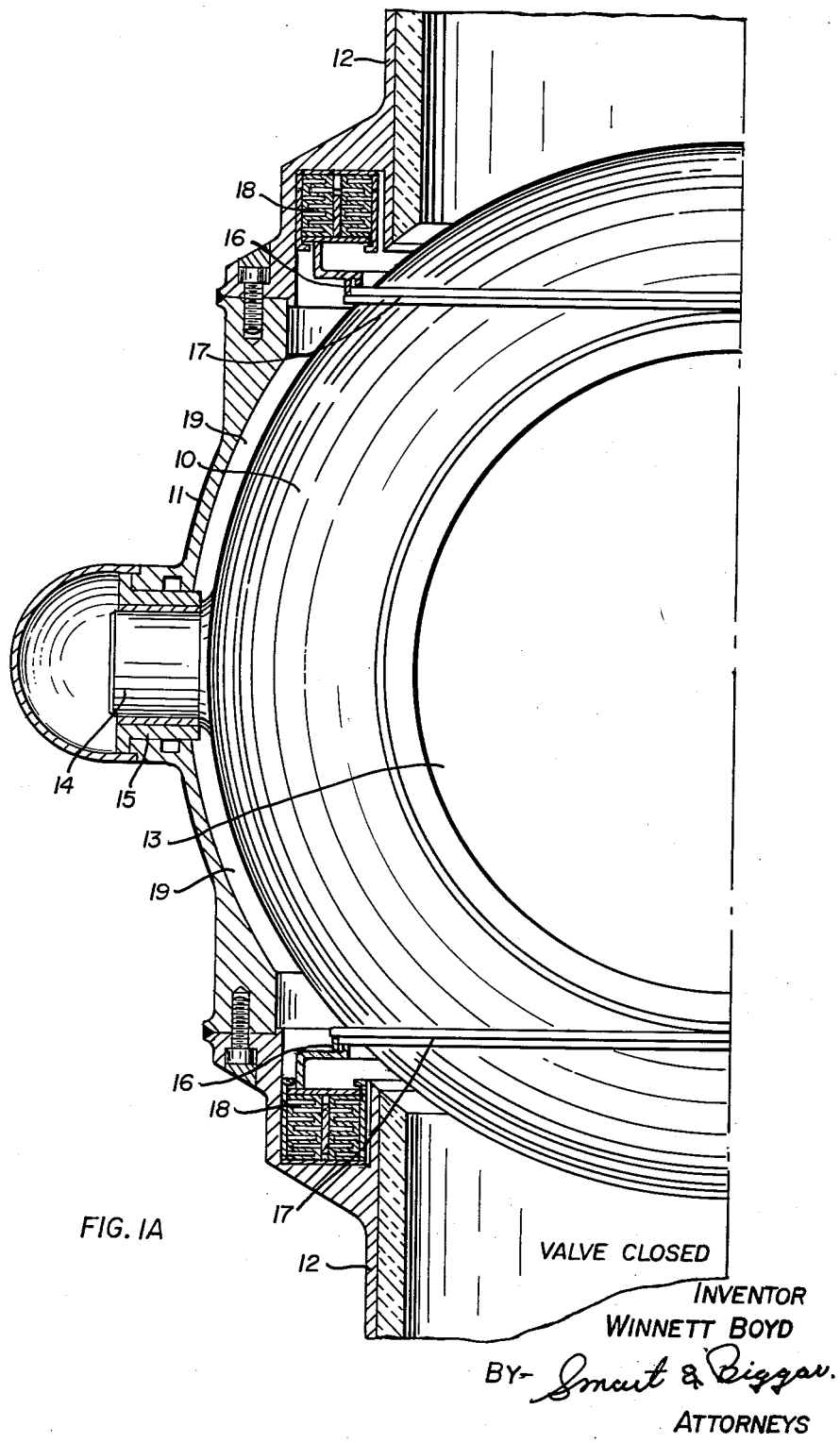
FIG. IA
VALVE CLOSED
INVENTOR
WINNETT BOYD
BY- Smart & Biggar.
ATTORNEYS Nov. 6, 1962

METAL BELLOWS

Filed April 25, 1960

4 Sheets-Sheet 2

VALVE OPEN

INVENTOR
WINNETT BOYD
BY- *Smart & Biggar.*
ATTORNEYS

Nov. 6, 1962 W. BOYD 3,062,238
METAL BELLOWS

Filed April 25, 1960 4 Sheets-Sheet 3

INVENTOR
WINNETT BOYD
BY- Smart & Biggar.
ATTORNEYS

INVENTOR
WINNETT BOYD
BY- Smart & Biggar.
ATTORNEYS

United States Patent Office 3,062,238
Patented Nov. 6, 1962

3,062,238
METAL BELLOWS
Winnett Boyd, Mount Royal, Quebec, Canada, assignor to Arthur D. Little, Inc., Cambridge, Mass.
Filed Apr. 25, 1960, Ser. No. 24,528
5 Claims. (Cl. 137—786)

This invention relates to a metal bellows which has a multiplicity of uses and which is particularly suitable for operating the sealing rings in large size valves such as spherical valves for example.

Metal bellows are usually made from sheet metal by forming the convolutions directly into thin metal tubes or by welding together around the inner and outer circumferences of the bellows a series or flat or formed sheet metal rings. While the first method of construction is suitable for small sizes only, the second method may be used for all sizes including the very largest. However, the second method of construction suffers from the very severe disadvantage of having a large amount of sheet metal welding which is frequently in the regions of very high, and in some cases, the highest stresses.

The present invention avoids this disadvantage while providing an annular metal bellows which, among other uses, is particularly well adapted to operate the sealing rings of very large high pressure spherical type gas valves suitable for use as isolating valves in the high pressure ducting associated with gas cooled nuclear reactors of the Calder Hall or Daniels-Boyd types. According to the present invention each of the walls of the annular expansible and contractible element of the bellows has a series of annular convolutions formed of the same continuous metal throughout the series of convolutions. Preferably the annular convolutions are formed by machining operations on a solid ring of metal and the flexing sections of each convolution are joined together by a connecting section of greater thickness than that of the flexing sections. Thus welded joints are avoided in the areas of highest stress in the expansible and contractible element of the bellows.

Figure 1B:
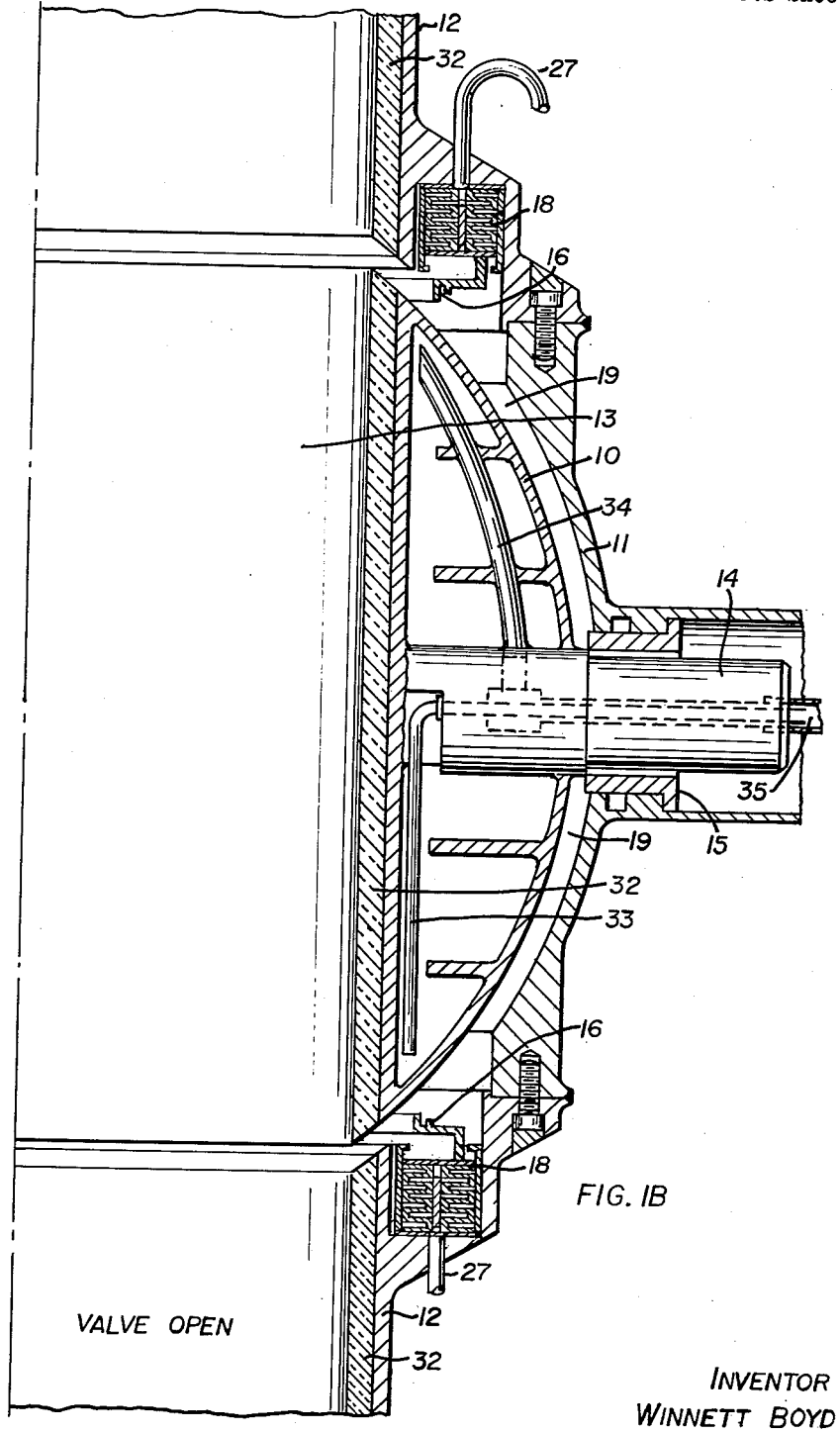

The invention will be described further with reference to the accompanying drawings, in which FIGURES 1A and 1B are sectional half-views of a large high pressure spherical type gas valve fitted with a metal bellows according to the present invention for operating the sealing rings of the valve.

Figure 2:
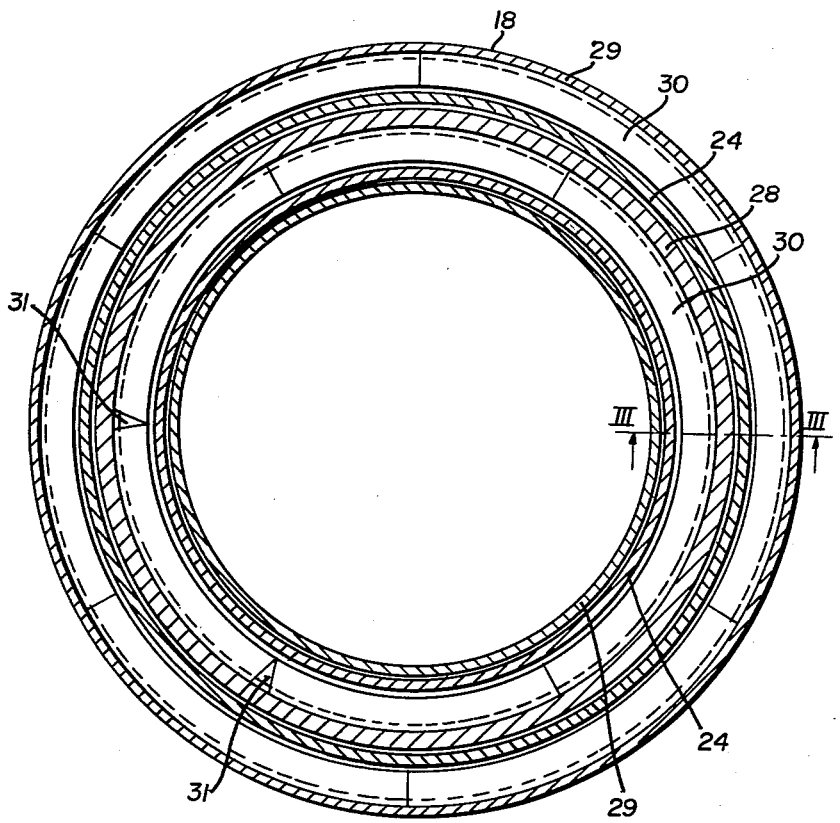
Figure 3:
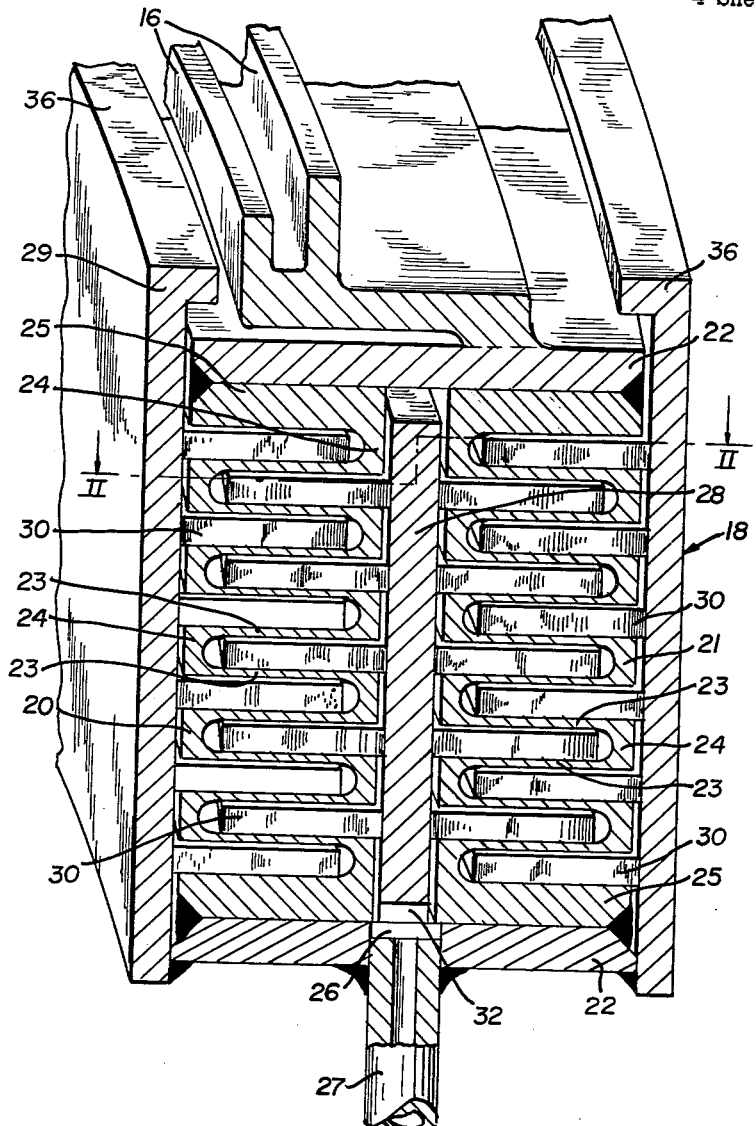

FIGURE 2 is a plan view in section of a metal bellows according to the present invention and taken on the line II—II in FIGURE 3, and FIGURE 3 is a cross-sectional view taken on the line III—III in FIGURE 2 but on a larger scale.

FIGURES 1A and 1B of the accompanying drawings illustrate a large high pressure spherical type gas valve in section, each figure showing one half of the valve. FIGURE 1A shows the valve in closed position and FIGURE 1B shows the valve in open position. The valve comprises a spherical rotor 10 located inside a hollow spherical casing 11. The casing 11 has two cylindrical projections 12 diametrically opposite one another which are connected to the ducting when the valve is installed. The rotor 10 has a circular passageway 13 diametrically through it and a pair of trunnions 14 on a diametrically center line at right angles to the center line of the passageway 13. These trunnions 14 operate in bearings 15 which are attached to the spherical casing 11. One of these trunnions 14 is extended to act as the valve spindle.

The rotor 10 can be turned on its trunnions 14 so that the passageway 13 will line up with the passageways in the cylindrical projections 12. When this is done the valve is in the open position as shown in FIGURE 1B and it has a clear circular passageway through it. If the rotor 10 is turned through 90° on its trunnions 14 the passageway through the valve will be blocked by the rotor 10. This is the closed position of the valve which is shown in FIGURE 1A.

It will be appreciated that when this type of valve is built in a large size that there will have to be a large clearance 19 between the rotor 10 and the spherical casing 11. Thus, movable sealing rings 16 are required to contact seats 17 on the rotor 10 when the valve is in the closed position. Metal bellows 18 according to the present invention are provided to operate the sealing rings 16.

As shown in FIGURE 3 the metal bellows 18 comprises an inner bellows ring 20 coaxially arranged with an outer bellows rings 21, the rings 20 and 21 being joined together by end plates 22 to form the annular expansible and contractible element of the bellows. The rings 20 and 21 are machined from solid rings of metal in such a way that their convolutions are formed of thin flexing sections 23 and thicker connecting sections 24. Also the end sections 25 are made thick to facilitate welding them to end plates 22. A passageway 26 is provided in the lower end plate 22 for connection of an inlet pipe 27 for the fluid for actuating the bellows.

To prevent the completed bellows from being damaged by excessive external pressure, a filler ring 28 (FIGURES 2 and 3) is inserted during assembly. To prevent the bellows from being damaged by excessive internal pressure, external cylindrical housings 29 are placed around the bellows and welded, as shown in FIGURE 3 to one of the end plates 22. Each housing 29 has an inturned flange 36 which acts as a stop to limit expansion of the bellows. To prevent each of the individual convolutions of the bellows from flexing beyond a safe limit, segmental filler pieces 30 are inserted during assembly. Clearances 31 (FIGURE 2) are provided where necessary for ease in insertion of the filler pieces 30 into the convolutions of the bellows. Also the filler pieces 30 and the filler ring 28 are sufficiently loosely fitting to permit circulation of the actuating fluid. The bottom of the filler ring 28 is provided with a series of scallops 32 to prevent blockage of the passageway 26.

The valve shown in the drawings is adapted for use at high temperatures and at high pressures. For these reasons joints may be seal welded and the passageways through the rotor 10 and the projections 12 are lined with carbon insulation 32 (FIGURES 1A and 1B). The valve shown has provision for cooling by water circulated through an inlet pipe 33, an outlet pipe 34 and coaxial connecting pipes 35.

Although the bellows is particularly well adapted for operating the sealing rings of gas valves, it may also be used for other purposes.

What I claim as my invention is:

1. Annular metal bellows comprising an inner bellows ring coaxially arranged with an outer bellows ring to form the walls of the annular expansible and contractible elements of the bellows, an annular end plate closing and sealed to each end of said elements, two cylindrical housing rings each extending in the direction of expansion and contraction of said bellows adjacent to a side surface of said annular expansible and contractible elements of said bellows, each of said housing rings being fixed at one edge to an edge of one of said annular end plates and being spaced away from the other of the said annular end plates; each of said walls of said elements having a series of annular convolutions and being formed of the same continuous metal throughout said series of convolutions; annular filler members substantially filling the spaces defined by said annular convolutions when said bellows is in its contracted condition, and a filler ring substantially filling the space between said inner and outer bellows rings and spaced therefrom, said filler ring being arranged to be contacted by both said upper and said lower end plates upon the exertion of pressure upon and externally of said upper end plate, said filler members and said end plates all being in parallel planes located at right angles to the surfaces of said filler ring and said housing rings, said filler members being mounted alternately upon said housing rings and said filler ring.

2. Annular metal bellows in accordance with claim 1 wherein each of said housing rings at its edge remote from the edge fixed to an edge of one of said annular end plates has an inturned flange beyond the other annular end plate adapted to act as a stop to limit expansion of said expansibile and contractible element of the bellows.

3. Annular metal bellows in accordance with claim 1, further characterized as having a passage through one of said annular end plates for entry of the fluid for actuating the bellows and means fixed to the other annular end plate for transmitting motion caused by expansion and contraction of said annular expansible and contractible element of the bellows.

4. Annular metal bellows structure comprising an annular inner bellows ring and an annular outer bellows ring concentric therewith and spaced therefrom, inner and outer cylindrical housing rings concentric with said bellows rings, spaced therefrom, and enclosing the sides thereof, a lower annular end plate attached to one end of each of said bellows rings and attached to one edge of each of said housing rings, an upper annular end plate attached to the opposite edges of said bellows rings and spaced away from said housing rings, a cylindrical filler ring positioned between said inner and outer bellows rings and spaced therefrom, said filler ring being arranged to be contacted by both said upper and said lower end plates upon the exertion of pressure upon and externally of said upper end plate, filler members mounted upon the facing edges of said inner and outer housing rings and extending into those convolutions of said bellows rings which face said housing rings, filler members mounted upon said cylindrical filler ring and extending into the convolutions of said bellows rings which face said filler ring, and means for introducing a fluid through said lower end plate into the space between said filler ring and said bellows rings, said filler members and said end plates all being in parallel planes located at right angles to the surfaces of said filler ring and said housing rings.

5. Annular metal bellows in accordance with claim 4 wherein each convolution of each of said bellows rings has two normally parallel flexing sections at right angles to the direction of expansion and contraction of the bellows, said flexing sections being joined together by a connecting section of greater thickness than that of said flexing sections.

References Cited in the file of this patent

UNITED STATES PATENTS

| | | |
|---|---|---|
| 1,870,902 | Giesler | Aug. 9, 1932 |
| 1,901,961 | Grant | Mar. 21, 1933 |
| 1,905,583 | Giesler | Apr. 25, 1933 |
| 2,209,325 | Dennis | July 30, 1940 |
| 2,470,288 | Childs | May 17, 1949 |
| 2,816,780 | Ross | Dec. 17, 1957 |
| 2,883,147 | Mirza et al. | Apr. 21, 1959 |

FOREIGN PATENTS

| | | |
|---|---|---|
| 620,372 | Germany | Oct. 19, 1935 |
| 1,213,643 | France | Nov. 2, 1959 |